United States Patent [19]

Wahl

[11] 4,299,398
[45] Nov. 10, 1981

[54] PRESSURE COMPENSATING SHAFT SEAL

[75] Inventor: Edward C. Wahl, Arlington Heights, Ill.

[73] Assignee: Gits Brothers Mfg. Co., Bedford Park, Ill.

[21] Appl. No.: 93,520

[22] Filed: Nov. 13, 1979

[51] Int. Cl.³ .................... F16J 15/34; F16J 15/46
[52] U.S. Cl. .......................... 277/65; 277/3; 277/27; 277/82
[58] Field of Search .................... 277/38–41, 277/65, 82, 83, 85, 103, 93 R, 93 SD, 59, 3, 27

[56] References Cited

U.S. PATENT DOCUMENTS

| | | | |
|---|---|---|---|
| 2,033,403 | 3/1936 | Smittle | 277/65 X |
| 2,653,833 | 9/1953 | Barron | 277/65 |
| 2,907,611 | 10/1959 | Robinson | 308/187.1 |
| 3,035,841 | 5/1962 | Riester | 277/27 X |
| 3,057,627 | 10/1962 | Main et al. | 277/3 |
| 3,079,605 | 2/1963 | Thomas et al. | 277/27 |
| 3,582,089 | 6/1971 | Amorese | 277/65 X |
| 3,591,188 | 7/1971 | Eisner | 277/65 X |
| 4,019,591 | 4/1977 | Fox | 175/107 |
| 4,101,139 | 7/1978 | Nordin | 277/65 X |
| 4,204,689 | 5/1980 | Johansson | 277/27 |

FOREIGN PATENT DOCUMENTS

| | | | |
|---|---|---|---|
| 833275 | 4/1960 | United Kingdom | 277/3 |
| 1215338 | 12/1970 | United Kingdom | 277/59 |
| 2013288 | 8/1979 | United Kingdom | 277/27 |

OTHER PUBLICATIONS

U.S. Pat. No. 3,659,662, 5/1972, Dicky.

Primary Examiner—Robert S. Ward, Jr.
Attorney, Agent, or Firm—Hill, Van Santen, Steadman, Chiara & Simpson

[57] ABSTRACT

Relatively rotating face ring-type shaft seals especially useful for sealing the shaft bearings and lubricant chamber of mud motor driven downhole drill rigs, have a plurality of telescoped annular seal rings slidably mounted in an annular carrier element and riding over the radial face on a face ring to define a sealed intermediate chamber therebetween. This intermediate chamber may be filled with lubricant. Either the telescoped rings or the face rings rotate with the shaft. Biasing means, such as a plurality of springs, load end faces on the seal rings against the radial face of the face ring. Pressure transmission means, such as pistons, O-rings, or the like, mounted in either the carrier element or the face ring, are loaded by the ambient media pressure, such as drilling fluid, to maintain pressure in the intermediate chamber responsive to the pressure of the ambient media. When the areas of the pressure transmission means exposed to ambient pressure and to intermediate chamber pressure are equal, a zero or negligible pressure differential will be maintained across the outer telescoped seal ring to prevent the ambient media, which is frequently quite abrasive, from entering the outer sealing ring interface. The inner telescoped seal ring serves as an auxiliary back-up face ring seal for the protected bearing chamber. Since the abrasive media being sealed does not enter the interfaces of the rings, the end faces of the inner and outer sealing rings riding on the face ring can be reduced or narrowed to a minimum and coated with a hard facing material such as tungsten carbide.

32 Claims, 7 Drawing Figures

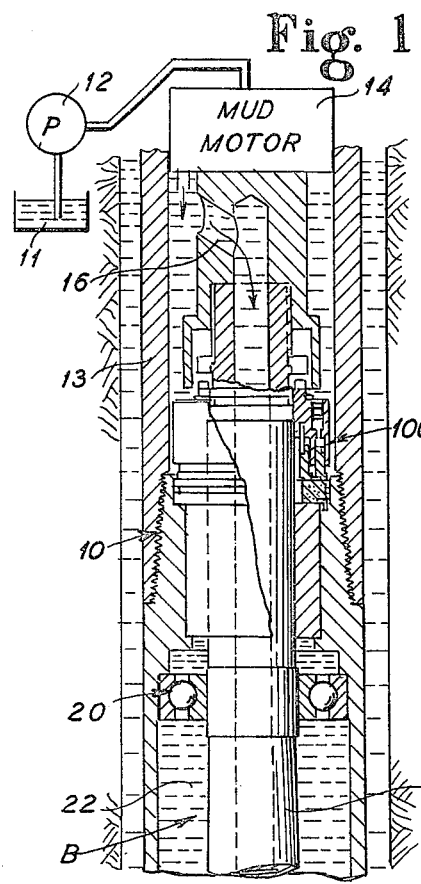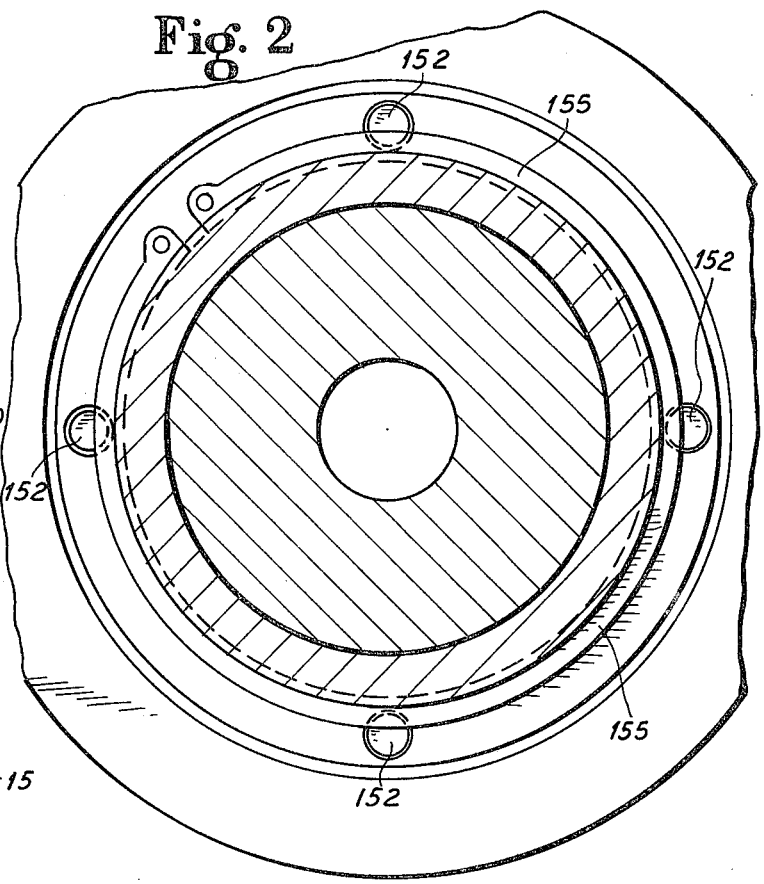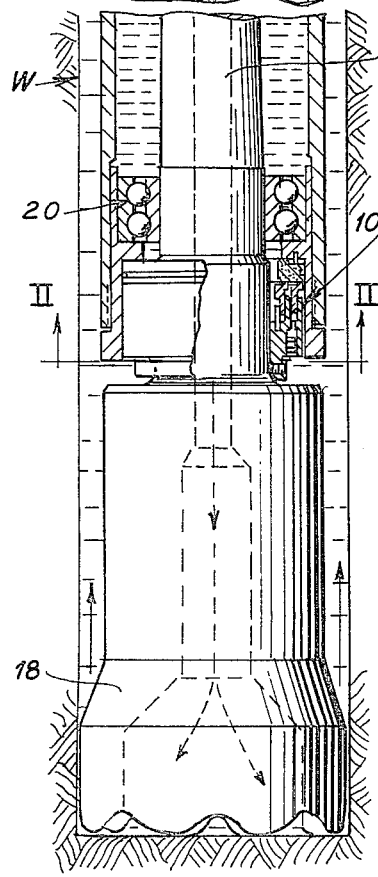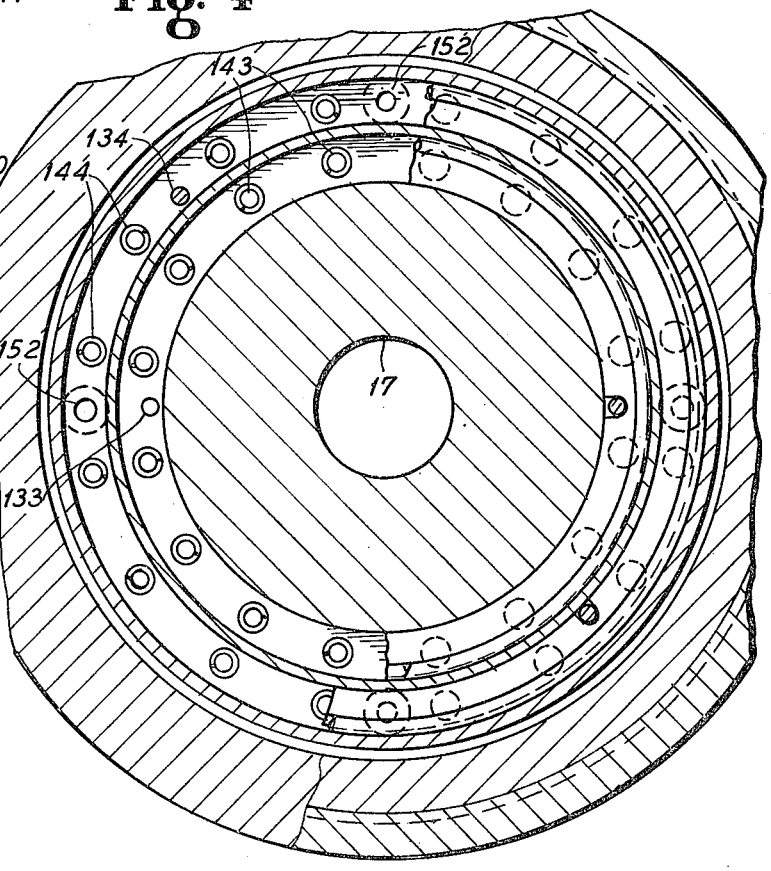

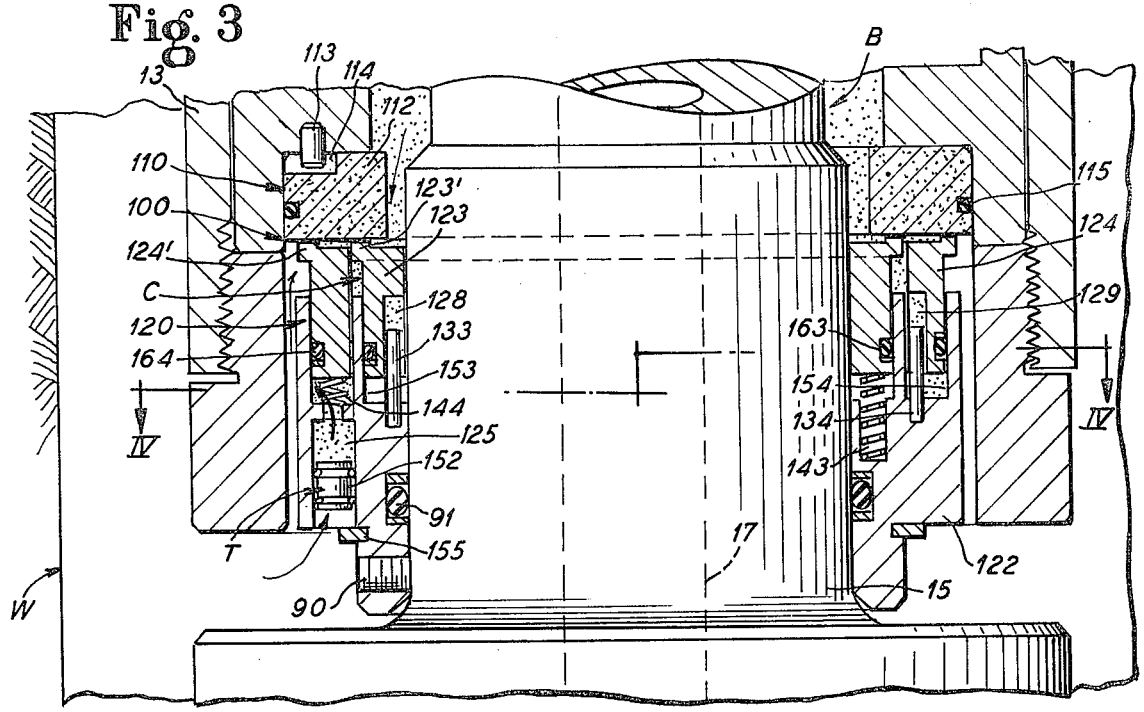
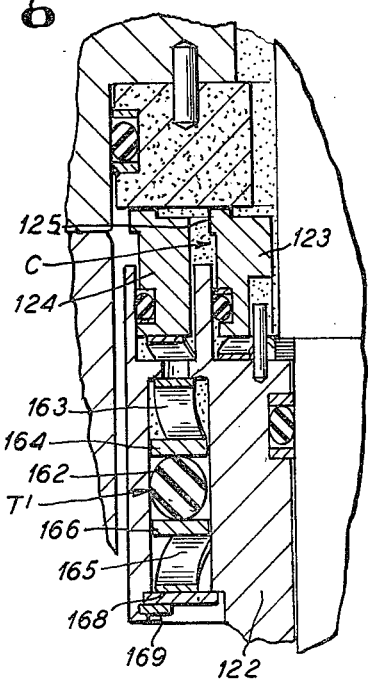
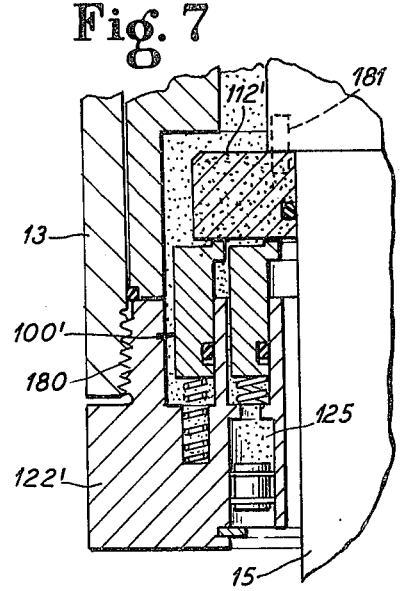
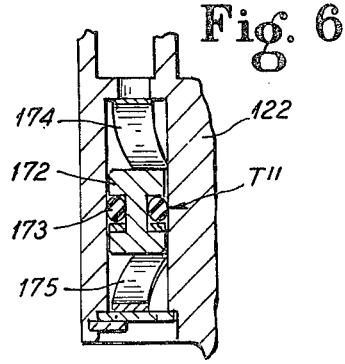

PRESSURE COMPENSATING SHAFT SEAL

BACKGROUND OF THE INVENTION

A. Field of the Invention

The invention relates to the art of relatively rotating face ring-type shaft seals and, more particularly, to seals for isolating high pressure abrasive-containing drill fluid, such as mud, for a fluid-driven downhole drill assembly from the bearing chamber for the rotary bit shaft.

B. Prior Art

Heretofor the wear life of bearings for fluid-driven downhole drill assemblies has been quite short because of the inability to seal these bearings from the abrasive drilling fluid such as mud. These drill assemblies include a drill string held stationary in a well to conduct a pressurized flow of motive drill fluid downwardly into the hole. Near the bottom of the drill string, there is a hydraulically operable motor or turbine which is motivated or propelled by the drill fluid. This motor or turbine in turn rotates a vertically disposed shaft, extending within the lower end of the drill string and driving the bit used to drill the well. Upon passage through the motor or turbine section, the drill fluid is passed out through the bit on the lower end of the shaft and flow upwardly through the well hole.

It is necessary to provide some form of bearing means in the annular space between the rotating shaft and the surrounding lower end of the stationary drill string. Unless these bearings are protected against the ingress of abrasive particles in the drilling fluid, which is typically in the form of mud, these bearings become permanently damaged. Since their replacement requires raising and lowering the drill string at great expense, many efforts have been made to exclude drilling fluid from the bearings by isolating them with seal means at opposed ends of the annular bearing chamber. Since the bearings often require lubricant, the seal means must also contain the lubricant in the bearing chamber.

An effective and economical seal means to protect the bearing chamber for drill bit shafts is a fundamental problem in the drilling art. If packing seals are provided at the top and bottom of the bearing chamber to confine the lubricant and prevent ingress of abrasive particles, these packing seals in turn are subject to the abrasive particles carried by the drill fluid and, consequently, quickly become worn to such an extent as to leak and allow the abrasive particles to enter the bearing chamber. Entry of the abrasive particles into the bearings ground up the bearings even when these were made of hard materials such as tungsten carbide. It has even been heretofore proposed that the bearing chamber lubricant be pressurized in accordance with the ambient drilling fluid pressure by means of a freely movable partition wall between the bearing chamber and drilling fluid to prevent drilling fluid leakage into the bearing chamber. This concept is illustrated in U.S. Pat. No. 4,019,591 to Fox. However, a disadvantage with this type of arrangement is that bearings must then operate in a lubricant environment of fluctuating pressures and generally very high drill fluid pressures. A further disadvantage regarding pressurization of the bearing chamber is that there is an opportunity for lubricant leakage from the bearing chamber due to the pressure differential across the bearing chamber caused by the drop in drill fluid pressure between the turbine or motor section side of the bearing chamber and that bearing chamber side facing the well hole space surrounding the drill bit.

It would therefore be a great improvement in the art to provide means which would effectively seal the bearings and bearing lubricant chambers for the shafts of fluid-driven drills so as to keep the bearings free from the abrasive particles in drilling fluid and contain the supply of lubricant for the bearings.

SUMMARY OF THE INVENTION

The present invention provides a seal system which will effectively protect the bearings in a fluid-driven downhole drill against ingress of abrasive particles carried by the drill fluid and seal lubricant within the bearing chamber. The seal system is of the relatively rotating face ring-type in which there are a plurality of radially telescoped annular seal rings riding over a face ring and having their contact end faces biased against a radial surface of the face ring. The telescoped rings are slidably mounted in an annular carrier element. In between the rings, there is defined a sealed intermediate chamber containing a fluid. The intermediate fluid pressure is made responsive to the pressure of a relatively high pressure ambient media being sealed by virtue of pressure transmission means mounted in either one of the face ring and the carrier element and having opposed end surfaces in communication with the intermediate chamber fluid at one end and the ambient media at the other end. The pressure transmission means may be in the form of free-floating pistons, O-rings, or the like with the areas in opposed end surfaces preferably sized equally so as to effect a zero or negligible pressure drop across the outer telescoped ring and the intermediate chamber such that the ambient media being sealed will not enter the outer seal ring and face ring interface. The inner telescoped seal ring serves as an inner barrier between the intermediate chamber and a protected space which may contain relatively low pressure fluid. In this manner, the inner seal ring is an auxiliary back-up face ring seal should the outer seal ring fail. The intermediate chamber fluid is preferably non-contaminating to the protected space and compatible with the fluid in the protected space in that slight leakage of intermediate chamber fluid into the protected space will not be harmful to the protected space or its fluid. Contact area of the end face for outer seal ring can be reduced or narrowed to a minimum, since the pressure differential across the outer seal ring is reduced, preferably to zero. Since the inner telescoped ring is protected by the outer ring and the intermediate chamber, the contact area of the end face of the inner seal ring interface can also be narrowed or reduced to a minimum.

In particular, when adapted to an abrasive fluid-driven downhole drill assembly, such as mud motor-driven, seal systems of the present invention may be located at opposed ends of an annular lubricant chamber containing drill shaft bearings. The intermediate chamber fluid is preferably a lubricant for the seal ring interfaces which is compatible with the bearing chamber lubricant. The drilling fluid pressure is always greater than the protected bearing chamber pressure, so that loss of bearing chamber lubricant is prevented.

It is then an object of this invention to increase the operating life of mud motor driven downhole drill rigs and the like apparatus by effectively sealing the bearings of such apparatus from the mud driving media.

Another object of this invention is to effectively isolate the bearings and bearing lubricating chambers of mud motor driven downhole drill apparatus from the driving mud medium.

A still further object of this invention is to provide a relatively rotating face type seal ring assembly especially useful in mud motor driven downhole drill apparatus which utilizes a plurality of telescoped seal rings isolating an intermediate chamber therebetween which is responsive to the pressure of the media being sealed for maintaining a negligible pressure drop across an outer seal ring between the media and the chamber and for protecting an inner seal ring between the chamber and the bearing from the abrasive mud media.

Another object of this invention is to provide a face ring seal with telescoped seal rings riding on a face ring forming a chamber therebetween which is sensitive to the ambient medium being sealed.

A specific object of this invention is to provide a relatively rotating face ring-type seal assembly, especially useful in fluid-driven downhole drill apparatus, wherein the drill fluid is abrasive-containing such as mud, having a plurality of radially telescoped annular seal rings isolating an intermediate fluid chamber therebetween, the pressure in which is responsive to the pressure of an ambient media being sealed for maintaining a zero or negligible pressure differential across the outer seal ring between the media and the intermediate chamber and which, in conjunction with the outer seal ring, protects the inner seal ring between the intermediate chamber and a drill shaft bearing chamber being protected from ingress of abrasive particles carried by the drill fluid.

BRIEF DESCRIPTION OF THE DRAWINGS

FIG. 1 is a broken vertical cross-sectional view with parts in side elevation of a mud motor-driven downhole drill assembly incorporating the seal system of the present invention.

FIG. 2 is a transverse cross-sectional view taken along the line II—II of FIG. 1.

FIG. 3 is a fragmentary vertical cross-section view with parts in side elevation of a seal of the present invention incorporated in the fluid-driven downhole drill assembly illustrated in FIG. 1 and shown on a large scale.

FIG. 4 is a cross-sectional view taken along the line IV—IV of FIG. 3.

FIG. 5 is a detailed fragmentary cross sectional view of an O-ring embodiment for the pressure transmission means.

FIG. 6 is a fragmentary cross-sectional view of a further alternative embodiment of the pressure transmission means for the seal system of the present invention in which a sealed ring is utilized.

FIG. 7 is a fragmentary cross-sectional view of an alternative embodiment to the seal system of the present invention wherein the rotating and stationary parts of the FIG. 3 embodiment are reversed.

DESCRIPTION OF THE PREFERRED EMBODIMENT

Those skilled in the art will readily appreciate that the seal system of the present invention will have application in many different environments wherein a high pressure ambient media is to be sealed from a relatively low pressure space. In its preferred embodiment, however, the seal system of the present invention is particularly useful in sealing abrasive-containing drill fluids from bit shaft bearing chambers in fluid-driven downhole drill assemblies.

As illustrated in FIG. 1, the reference numeral 10 refers to a fluid-driven downhole drill assembly, wherein mud is utilized for the drill fluid. In typical fashion, mud drill fluid is drawn from a reservoir 11 and pressurized by means of a hydraulic pump 12. The pumped mud is passed downwardly through a stationary drill string casing 13 and serves as motor fluid for a mud motor 14, typically a hydraulically operated rotary turbine, which is drivingly connected to the upper end of a rotary drill bit shaft 15. Upon passage through the mud motor 14, drilling mud passes through port 16 in the bit shaft 15 into a bore 17 through the lower end of shaft member 15 for circulation downwardly and out through an aligned bore contained in the drill bit 18, fitted on the lower end of the shaft 15. The spent drilling mud then passes upwardly through the well hole W.

The bit shaft 15 is mounted for rotation within the stationary string casing 13 by bearing means 20 in a manner well known in the art. The bearings 20 may be contained within an annular space, concentric with the bit shaft 15 and filled with lubricant 22, to define a bearing chamber B. In order to protect the bearing chamber against ingress of abrasive particles carried by the mud drill fluid and contain the lubricant 22 within the bearing chamber B, seal systems 100 are positioned at the upper and lower ends of the bearing chamber B. At all times when drilling mud is being passed downwardly through the stationary drill string 13, out through the drill bit 18, and upwardly through the well hole W, the drill fluid is under pressures greater than lubricant pressure within the bearing chamber B.

Referring to FIG. 3, the seal system 100 is shown comprised of relatively rotating face ring sub-assemblies 110 and 120. Sub-assembly 110 comprises a face ring 112 having a relatively wide radial face surface located nearest to the bearing chamber B. The face ring 112 is stationary and attached to the stationary bearing chamber housing formed by the drill string casing 13 by means of one or more anti-rotation pins 113 set in the bearing housing and loosely engaged in respective slots 114 formed in the face ring 112. The anti-rotation pins 113 may be annularly spaced about the face ring 112. An O-ring 115 may be mounted along the radially outward sidewall of the face ring 112 to insure that the stationary ring 112 is sealingly mounted against the bearing housing walls. The face ring 112 may be formed from carbon impregnated with silicon carbide.

Seal sub-assembly 120 is positioned furthermost away from the bearing chamber B relative to sub-assembly 110. Sub-assembly 120 is comprised of a carrier element 122 fixed for rotation with the bit shaft 15 and in which are mounted a plurality of radially telescoped annular seal rings 123 and 124 for rotation therewith. The ring 123 and 124 extend within the confines of the radial face of ring 112. The carrier element 122 is fastened to the bit shaft 15 by means such as a set screw 90 and sealingly fitted thereto by seal means, such as O-ring 91. The inner 123 and outer 124 seal rings are drivingly carried in annular channels 153 and 154 formed in the carrier element 122 by means of a plurality of respective anti-rotation pins 133 and 134, which are set in the carrier element housing and loosely engage slots 128 and 129 formed in the seal rings. The respective drive pins and slots may be annularly spaced about the carrier element 122 and the seal rings 123 and 124. The loose fit of the seal rings 123 and 124 in their respective channels 153 and 154 and the loose fit of the pins 133 and 134 in the respective slots 128 and 129 allow freedom for axial, radial, and angular adjusting movement of the seal rings 123 and 124. Each of the seal rings is slidably mounted in an annular channel formed on the carrier element 122; and each ring is independently biased outwardly from its channel such that the respective contact end faces 123' and 124' engage in rubbing contact with the face ring 112 at inner and outer interfaces. The seal rings 123 and 124 may be formed from stainless steel and the contact end faces 123' and 124' are preferably formed of tungsten carbide coated on the stainless steel.

The biasing means may be in the form of coil springs as shown in FIG. 3. As shown in FIG. 4, a plurality of annularly spaced coil springs 143 may be located beneath the inner telescoped seal ring 123; and a plurality of annularly spaced coil springs 144 may be located in the respective channel beneath the outer telescoped ring 124. Individual wave or leaf springs may be utilized as biasing means for the seal rings 123 and 124, rather than coil springs, as illustrated in the FIG. 6 embodiment. Those skilled in the art will readily appreciate that continuous annular spring means could be utilized to bias the seal rings 123 and 124, rather than a plurality of individual coil springs as shown in FIGS. 3 and 4. However, the use of a plurality of individual spring members further enables easy and accurate adjustment of the biasing force on each seal ring in that individual spring members can be readily added or removed as desired.

The telescoped spaced seal rings 123 and 124 define a fluid-filled annular intermediate chamber C therebetween closed by the radial surface of the face ring 112. To maintain a sealed space for the intermediate chamber fluid 125, the inner and outer rings 123 and 124 are sealingly mounted within their respective channels 153 and 154, by seal means, such as O-rings 163 and 164. The O-rings 163 and 164 may be mounted along the radially outer sidewalls of the seal rings. The intermediate chamber fluid 125, in the case of a downhole drill assembly, is preferably non-abrasive and a lubricant for the seal ring interfaces compatible with the oil 22 in the bearing chamber B. Any slight leakage of intermediate chamber fluid will not be harmful to the protected space or its fluid. Within pressure transmission means-receiving channels formed in the element 122, there is mounted movable pressure transmission or compensating means T, which communicate at one end with the intermediate chamber fluid 125 and at the other end with ambient media, the drilling mud. The channels are located on a seal sub-assembly to make for a compact face ring seal assembly.

As illustrated in FIGS. 3 and 4, the pressure transmission means T may take the form of a plurality of annularly spaced free-floating pistons 152, slidably mounted in a series of annularly spaced individual pressure transmission means-receiving channels formed in the surface of the carrier element 122 facing the ambient mud media. The free floating pistons 153 may be sealingly mounted within their respective channels by means of O-ring seals located on the piston sidewalls. Means such as snap ring 155 positioned about a radially outer surface of the carrier element 122 serve to retain the pressure transmission pistons 152 within their respective channels.

Opposed sides of the pressure transmission means T are respectively exposed to the drilling mud and intermediate chamber fluid. The areas of these opposed sides may be made equal so that there is substantially no pressure differential across the outer seal ring 124 and face ring 112 interface. This pressure equalization serves to preclude ingress of drilling mud and reduce sliding friction and wear on the end face 124'. Since the intermediate chamber fluid pressure is then in a one-to-one ratio with the ambient mud media, fluid pressure within the intermediate chamber C is always greater than lubricant pressure in the bearing chamber B. Hence, lubricant is prevented from leaking out from the bearing chamber B across the inner seal ring 124 and face ring 112 interface. Pressurization of intermediate chamber fluid 125 in the form of lubricant enables this fluid to also offer lubricant at the seal rings 123 and 124 and face ring 112 interfaces to further reduce part wear.

It will, of course, be understood that other equivalent forms for the pressure transmission means T are within the contemplation of the present invention. The pressure transmission means T may also comprise a single continuous annular member, such as a piston ring for slidable mounting within an annular pressure transmission means-receiving channel formed on the carrier element, rather than a plurality of individual pressure transmission means members. The pressure transmission means T need not be free-floating, but may be supported on opposed sides within a pressure transmission means-receiving channel by opposed forces acting equally to bias the movable pressure transmission member into a neutral position within its channel. In this regard, FIG. 5 illustrates an alternative pressure transmission means T'. Each pressure transmission means T' is comprised of a movable O-ring portion 162 slidably mounted within its respective carrier element channel. The O-ring member 162 is mounted for slidable movement within its channel against the bias of opposed upper 163 and lower 165 leaf-springs, which engage the O-ring 162 through loosely mounted upper 164 and lower 166 plates positioned at opposed ends of the O-ring 162. The upper leaf-spring 163 is braced against the upper end wall of the pressure transmission means-receiving channel; and the lower leaf-spring 165 is braced in the open end of the channel by means of a support plate 168 held in position by a snap ring member 169 fitted on the carrier element 122. Further, in this regard, FIG. 6 illustrates a pressure transmission means T'' formed by a cylinder or piston member 172 having an annular centrally located recess thereon. Each movable member 172 is sealingly contained within its pressure transmission means-receiving channel by means of a O-ring seal member 173 fitted about the annular central recess of the I-shaped member 172. Member 172 may be slidable against the bias of upper and lower leaf-springs 174 and 175, which serve to position and maintain the slidable member 172 within its channel.

Operation of the seal system 100 according to the present invention may be ascertained with reference to FIG. 3. The outer seal ring 124 and the face ring 112 serve as a barrier against ingress of drilling mud media to the bearing chamber B. The end face surface 124' of the outer telescoped ring 124 is maintained in rubbing contact against the face ring 112 by the force of the biasing means 144. However, to further insure against leakage across the outer seal ring interface, mud media pressure is permitted to act upon exposed surfaces of the pressure transmission means T such that the fluid 125 contained in the intermediate chamber C becomes directly and accordingly pressurized responsive to the pressure of the ambient media. Since the opposed sides of the pressure transmission means T are of equal area, the pressure differential across the outer seal ring interface is zero or negligible such that drilling mud is unable to pass through the outer ring 124 and face ring 112 interface and into the intermediate chamber C. The end face surface 123' of the inner telescoped ring 123 is maintained in rubbing contact with the face ring 112 by the force of biasing means 143 so as to act as an auxiliary or back-up barrier against ingress of drilling mud media to the bearing chamber B should the outer seal assembly 124, 112 fail and serves to contain lubricant 22 in the bearing chamber B. The preclusion of lubricant leakage from the bearing chamber B across the inner seal ring interface is insured by virtue of the pressure differential across the inner seal ring interface, caused by pressurization of the intermediate chamber fluid 125 equal to that of the mud media which is always at a pressure level greater than that of the fluid 22 contained in bearing chamber B. Leakage of intermediate chamber fluid into the bearing chamber B would be minimal due to the rubbing contact of the inner seal ring contact surface 123' caused by the biasing means 143; however, such leakage would not be harmful in that the intermediate chamber fluid 125 is chosen to be a lubricant compatible with the bearing chamber lubricant and not abrasive to the bearings. Location of the pressure transmission means T substantially between the seal rings 123 and 124 and within a sub-assembly part, here shown as the carrier element 122, enables the seal system to be compact and affords easy access to the elements for maintenance.

Since there is substantially no pressure differential across the outer seal ring interface, the area of the outer ring contact surface 124' can be reduced to a minimum. Since there is a pressure differential across the inner seal ring interface to insure against leakage of lubricant 22 from the bearing chamber B and since the inner seal assembly 123, 112 is protected by the outer seal assembly 124, 112 and intermediate chamber fluid barrier, the area of the inner seal ring contact surface 123' can be reduced to a minimum.

Many variations may be made of the present invention without departing from the scope thereof. For example, it remains within the scope of the present invention to utilize a series of intermediate fluid chambers spaced radially inward from the ambient media to the protected spaced chamber in order to further duplicate the fluid barrier seal effect provided by an intermediate chamber. Also, it remains within the scope of the present invention to utilize pressure transmission means having differential area fluid-acting surfaces, such that an exact zero or negligible pressure differential between the ambient media and the intermediate chamber fluid does not occur but that the intermediate chamber fluid continues to serve as a outer ring interface barrier against ingress of ambient media. The roles of rotating and stationary sub-assemblies may be reversed for the seal system of the present invention without departing from the spirit of the invention. FIG. 7 illustrates seal system 100' of the present invention for use in combination with a downhole drill assembly wherein the carrier element 122' is fixedly attached to the stationary drill casing 13 as by screw threads 180 and the face ring sub-assembly 112' is connected for rotational movement with the bit shaft 15 by a drive pin 181 or the like. It further remains with the scope of the present invention to locate the face ring sub-assembly furthermost from the protected chamber and the carrier element nearmost such that the pressure transmission means and pressure transmission means-receiving channels are mounted in the face ring.

Although various minor modifications may be suggested by those versed in the art, it should be understood that I wish to embody within the scope of the patent warranted hereon all such modifications as reasonably and properly come within the scope of my contribution to the art.

I claim as my invention:

1. A shaft seal for sealing a variable pressure medium from a shaft bearing which comprises a face ring, a pair of spaced telescoped seal rings respectively exposed to the medium and to the bearing and each having an end face riding on said face ring and cooperating therewith to define therebetween a sealed intermediate chamber, means transmitting pressure of the medium to said intermediate chamber without exposing the intermediate chamber to the medium to minimize any pressure difference across the seal ring exposed to the medium and to protect the seal ring exposed to the bearing from the medium, and means relatively rotating said face ring and said seal rings.

2. The seal of claim 1 wherein said intermediate sealed chamber is filled with lubricant exposed to the face ring.

3. The seal of claim 1 including separate spring means for each of said seal rings for selectively bearing their end faces against the face ring.

4. The seal of claim 1 including an annular carrier element supporting said pair of seal rings in slidable, sealed relationship therewith.

5. The seal of claim 4 wherein said face ring is locked against rotation and said carrier element is rotated.

6. The seal of claim 4 wherein said carrier element is locked against rotation and said face ring is rotated.

7. A seal system of the relatively rotating face ring-type to seal a high pressure ambient media from a protected space containing a relatively low pressure fluid, which comprises:

a first ring having a relatively wide radial face, a pair of radially telescoped annular seal rings extending within the confines of the wide radial face of said first ring having contact end faces, means independently biasing a contact end face on each seal ring into rubbing contact with the radial face of said first ring, the radially outer seal ring being exposed to the ambient media being sealed, the radially inner seal ring being exposed to the protected space fluid, an annular carrier element having annular channels slidably supporting said pair of seal rings in sealed relationship therewith and cooperating with said seal rings to form an intermediate chamber closed between said pair of seal rings by the radial face of said first ring, a fluid filling said intermediate chamber, and pressure transmission means sealingly supported between the ambient media and the intermediate chamber responsive to pressure changes in the ambient media, whereby ingress of ambient media across the interface between said first ring and the end face of said radially outer seal ring and leakage of protected space fluid across the interface between said first ring and the end face of said radially inner seal ring are minimized.

8. The seal system according to claim 7 wherein the areas of the opposed sides of said pressure transmission means respectively exposed to said ambient media and intermediate chamber fluids are equal so that there is substantially no pressure differential across the outer seal ring and first ring interface and so that protected space fluid is prevented from leaking across the inner seal ring and first ring interface.

9. The seal system according to claim 7, wherein each seal ring end face has a narrow contact area.

10. The seal system according to claim 7 including means for driving each said seal ring in its respective channel which allows freedom for axial, radial, and angular movement of its seal ring.

11. The seal system according to claim 7, wherein said first ring is locked against rotation and said carrier element is rotated.

12. The seal system according to claim 7, wherein said carrier element is locked against rotation and said first ring is rotated.

13. The seal system according to claim 7, wherein intermediate chamber fluid is compatible with said protected space fluid.

14. The seal system according to claim 13, wherein said intermediate chamber fluid is lubricant for seal ring and first ring interfaces.

15. The seal system according to claim 7, wherein said seal ring biasing means comprises a plurality of independent spring members circumferentially spaced in said carrier element and biased against said seal rings.

16. The seal system according to claim 7, including a plurality of separate, circumferentially spaced pressure transmission means-receiving channels in said carrier element.

17. The seal system according to claim 16, wherein said pressure transmission means comprises a plurality of free-floating pistons, one said piston in each said pressure transmission means-receiving channel.

18. The seal system according to claim 16, wherein said pressure transmission means comprises a plurality of movable members, one said movable member in each said pressure transmission means-receiving channel and spring means within each said pressure transmission means-receiving channel supported on opposed sides of the movable member to bias the movable member into a neutral position in its pressure transmission means-receiving channel.

19. The seal system according to claim 18, wherein said movable members each comprise an O-ring portion.

20. The seal system according to claim 18, wherein said movable members each comprise a cylindrical element having an annular centrally located recess, each said recess supporting O-ring means thereabout.

21. The seal system according to claim 7, 11, or 12 wherein said pressure transmission means-receiving channels are formed in said carrier element.

22. In a downhole drill assembly having a rotated drill bit mounted to drill a well hole, a hydraulically operated motor, a shaft connecting said motor and bit, a stationary drill string carrier surrounding said shaft and spaced therefrom providing an annular chamber between said drill string and said shaft, lubricant and shaft bearing means in said annular chamber, and means flowing pressurized abrasive drilling fluid through the motor for driving the shaft and about the annular chamber, the improvement comprising a bearing and lubricant seal in said annular chamber having:

a first ring with a relatively wide radial face,
a pair of radially telescoped annular seal rings extending within the confines of the wide radial face of said first ring and having contact end faces,
means independently biasing a contact end face on each seal ring into rubbing contact with the radial face of said first ring,
the radially outer seal ring being exposed to said drilling fluid being sealed,
the radially inner seal ring being exposed to lubricant for the bearings,
an annular carrier element having annular channel means slidably supporting said pair of seal rings in sealed relationship therewith and cooperating with said seal rings to form an intermediate chamber closed between said pair of sealed rings by the radial face of said first ring,
a fluid filling said intermediate chamber,
and pressure transmission means sealingly supported between the drill fluid and the intermediate chamber responsive to changes in pressure in said drilling fluid, whereby ingress of of drilling fluid across the interface between said first ring and the end face of said radially outer seal ring and leakage of lubricant across the interface between said first ring and the end face of said radially inner seal ring are minimized.

23. The seal system for the downhole drill assembly according to claim 22, wherein the areas of the opposed sides of said pressure transmission means respectively exposed to said drill fluid and intermediate chamber fluid are equal, so that there is substantially no pressure differential across the outer seal ring and first ring interface and so that lubricant is prevented from leaking from said annular chamber across the inner seal ring and first ring interface.

24. The seal system for the downhole drill according to claim 22, wherein each seal ring end face has a narrow contact area.

25. The seal system for the downhole drill assembly according to claim 22, said seal system further comprising means for driving each said seal ring in its respective channel which allow freedom for axial, radial, and angular movement of its seal ring.

26. The seal system for the downhole drill assembly according to claim 22, wherein said first ring is locked against rotation and said carrier element is rotated.

27. The seal system for the downhole drill assembly according to claim 22, wherein said carrier element is locked against rotation and said first ring is rotated.

28. The seal system for the downhole drill assembly according to claim 22, wherein intermediate chamber fluid is compatible with said annular chamber lubricant.

29. The seal system for the downhole drill assembly according to claim 28, wherein said intermediate chamber fluid is lubricant for seal ring and first ring interfaces.

30. The seal system for the downhole drill assembly according to claim 22, wherein said seal ring biasing means comprises a plurality of independent spring members, circumferentially spaced in said carrier element and biased against said seal rings.

31. The seal system for the downhole drill assembly according to claim 22, including a plurality of separate, annularly spaced pressure transmission means-receiving channels in said carrier element.

32. The seal system for the downhole drill assembly according to claim 22, 26, or 27 wherein said pressure transmission means-receiving channels are formed in said carrier element.

* * * * *